United States Patent [19]

Lew et al.

[11]  4,418,948
[45]  Dec. 6, 1983

[54] ELASTIC COUPLING FOR PIPES AND TUBES

[76] Inventors: Hyok S. Lew, 7890 Oak St., Arvada, Colo. 80005; Ronald R. Chapman, 9425 Calle El Milagro, Tucson, Ariz. 85704

[21] Appl. No.: 261,042

[22] Filed: May 6, 1981

[51] Int. Cl.³ .................. F16L 25/00; F16L 17/00; F16L 27/10; F16L 21/00
[52] U.S. Cl. ............................... 285/420; 285/112; 285/223; 285/364; 285/408
[58] Field of Search .............. 285/112, 108, 223, 336, 285/364–367, 406–408, 411; 403/338

[56] References Cited

U.S. PATENT DOCUMENTS

| | | | |
|---|---|---|---|
| 2,424,436 | 7/1947 | Crater | 285/408 |
| 2,457,077 | 12/1948 | Woolsey | 285/367 X |
| 2,548,249 | 4/1951 | Woolsey | 285/367 X |
| 2,778,661 | 1/1957 | Leighton | 285/367 X |
| 3,116,078 | 12/1963 | Scherer | 285/112 X |
| 3,476,410 | 11/1969 | Pastva | 285/112 |

*Primary Examiner*—Richard J. Scanlan, Jr.

[57] ABSTRACT

This invention relates to a method for coupling or joining pipes and tubes wherein an elastic force stored in said elastic coupling perpetually exerts a force that maintains a leak-proof connection between two ends of the pipes or tubes. Said elastic coupling comprises a plurality of the segments of an elastic ring having a cross section of annulus with an opening on the inward side of said elastic ring and a clamping collar of annular geometry with a groove on the inward side of said clamping ring, in which groove said plurality of the elastic ring segments are disposed in a confined fashion. The rims of two matching flanges built on each end of two pipes or tubes to be connected are received by said plurality of the elastic ring segments through said openings of the elastic ring segments. When the clamping collar is clamped down onto the pipe or tube surfaces, the cross section of the elastic ring segments is forced to contract and, consequently, the opening on the cross section of the elastic ring segments becomes compressed, which action compresses said two flanges toward one another compressing a seal disposed intermediate said two flanges, which combination results in an elastically compressive coupling. When said plurality of the elastic ring segments are replaced with another plurality of the elastic ring segments having a cross section of Omega-shape, an elastically expansive coupling results. By using a combination of said two different elastic ring segments, one can construct an elastically expansive-compressive coupling for joining the pipes or tubes.

3 Claims, 9 Drawing Figures

ELASTIC COUPLING FOR PIPES AND TUBES

The art of coupling or joining two pipes or tubes carrying a pressurized fluid is very old and, yet, it is an art that requires much improvement. The present invention is to provide an answer to said requirement in the area of so called "clamp" type coupling of pipes and tubes wherein no permanent bonding such as the welding or gluing as well as no threaded means are employed.

The primary object of the present invention is to provide a "clamp" type pipe or tube coupling wherein an elastic force stored in the elastic coupling of the present invention provides a perpetual force maintaining the optimum pipe or tube coupling condition.

Another object of the present invention is to provide the elastic coupling with a flexibility and resiliency that adapts itself to the changing conditions of the pipe or tube joint due to the external force on the pipe or tube joint or due to the extreme temperature.

A further object of the present invention is to provide an effective and economic expansion joint.

Still another object of the present invention is to provide a light weight quick-disconnecting type pipe or tube coupling.

Yet a further object of the present invention is to provide an economic pipe or tube coupling of sufficient strength and rigidity.

These and other objects of the present invention will become further clear as the specification of the present invention proceeds. The present invention may be explained with a greater clarity and specificity by referring to the following Figures.

Figure 1:
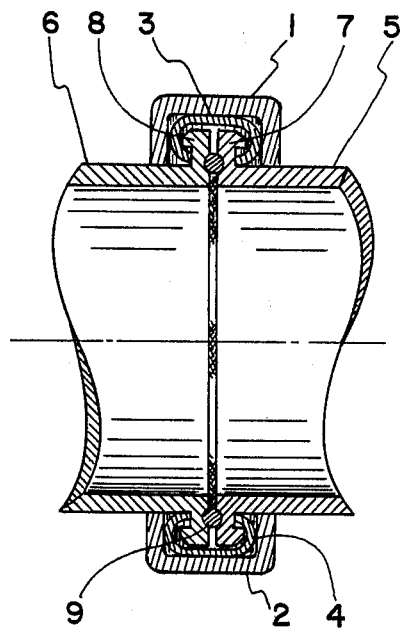
FIG. 1 illustrates a cross section view of an "elastic coupling" taken along a plane including the axis of the pipe or tube
Figure 2:
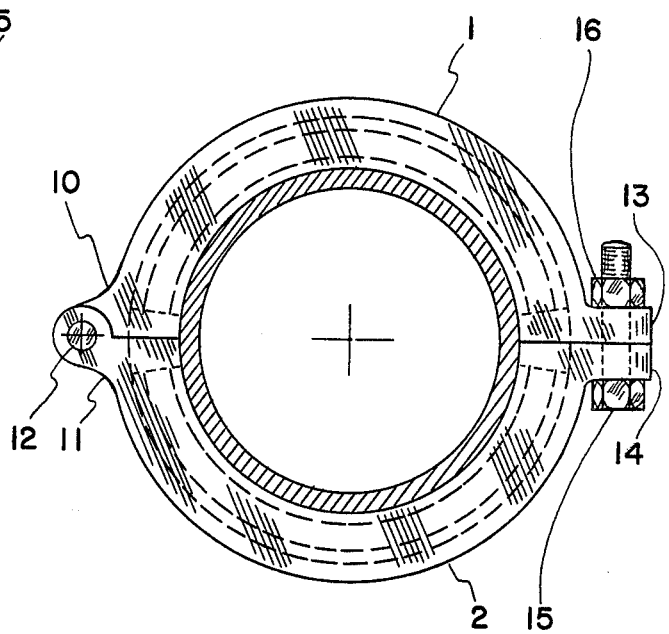
FIG. 2 illustrates an end view of the "elastic coupling" shown in FIG. 1.

In FIGS. 1 and 2, there is shown a pair of pipes or tubes joined together by using an "elastic coupling" constructed in accordance with the principles of the present invention. A clamping collar comprising a top half 1 and a bottom half 2, which two halves are pivotably connected to one another by a pin 12 at one ends 10 and 11, and threadedly clamped to one another at the other ends 13 and 14 by means of a bolt 15 engaging a nut 16, is clamped around a pair of matching flanges 7 and 8 built on each end of two pipes or tubes 5 and 6 connected to one another. Said two halves 1 and 2 of the clamping collar have a U-shaped cross section providing a groove, into which groove a pair of the elastic ring segments 3 and 4 are disposed in a confined fashion. The elastic ring segments 3 and 4 have an annular cross section with an opening on inward side of said elastic ring. The rims of the pair of flanges 7 and 8 are engaged into the elastic ring segments 3 and 4 through the opening on the cross section of said elastic ring segments. The flanges 7 and 8 may be constructed on a pipe by cutting a groove on the outer surface of the pipe while they have to be built on the wall of the thin walled tubes. The pair of flanges 7 and 8 intermediate with a resilient seal 9 is disposed, may be further provided with a pair of grooves, repectively which grooves are engaged by the edges of the opening on the cross section of the elastic ring segments 3 and 4. The rims of the flanges 7 and 8 may be chamfered to facilitate the engagement of said flanges into the elastic ring segments 3 and 4. When the pair of the elastic ring segments 3 and 4 confined within the groove provided on the inward face of the clamping collar become pressed down toward to the axis of the pipes or tubes 5 and 6, the cross sections of the elastic ring segments 3 and 4 are forced to contract and, consequently, results in reducing the opening on the cross section of the elastic ring segments, which action presses two flanges 7 and 8 toward one another compressing the seal 9 intermediate said two flanges. As a consequence, a leak-proof elastic coupling joining two pipes or tubes is provided. The elastic ring segments 3 and 4 are made of a strong elastic material such as a spring steel and, consequently, the force compressing the matching flanges 7 and 8 is the elastic force originating from the elastic energy stored in the elastic ring segments 3 and 4 while these elastic ring segments were being squeezed by the clamping collar during the clamping action. As the seal 9 yields under constant pressure by the pair of flanges 7 and 8, the elastic compression on said flanges by the elastic ring segments 3 and 4 further compresses said two flanges to one another and maintains the required pressure on the seal 9 no matter how the thickness of the seal changes, which characteristics of the elastic coupling provides long lasting leak-proof joint of two pipes or tubes in spite of deteriorating seal. It must be emphasized that the elastic coupling shown in FIGS. 1 and 2 provides all the rigidity required to keep the pair of pipes or tubes 5 and 6 in line while said elastic coupling allows a minute axial movement to adjust the pipe or tube joint to the changing conditions resulting from the force and temperature changes on the pipe or tube joint as well as the flattening seal. The positions taken by various elements of the elastic coupling before and after clamping are further explained in conjunction with FIG. 3.

Figure 3:
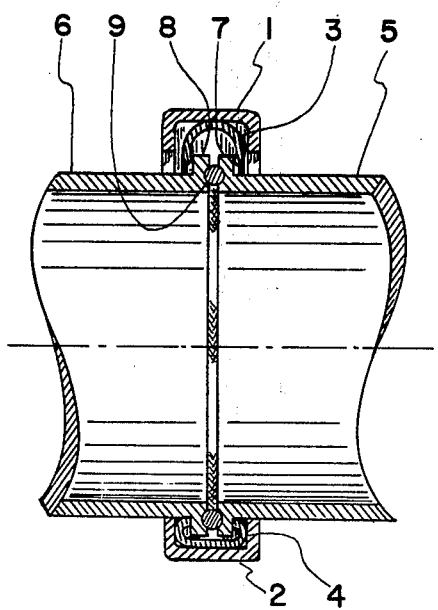
FIG. 3 illustrates the positions taken by different elements of the "elastic coupling" shown in FIG. 1 before and after the clamping down of said elastic coupling onto the pipe or tubes.

There is shown in FIG. 3 an illustration showing how the elastic coupling illustrated in FIGS. 1 and 2 works. The top half of the elastic coupling comprising the top half of the clamping collar 1 and the elastic ring segment 3 is merely placed around two matching flanges 7 and 8 with an O-ring seal 9 intermediate said two flanges. At this pre-clamping position, the elastic ring segment 3 is at relaxed state having a near circular annular cross section with an opening receiving the rims of two flanges wide open, in which state the elastic ring segment 3 is loosely confined within the groove of the top half of the coupling collar 1. The bottom half of the elastic coupling comprising the bottom half of the clamping collar 2 and the elastic ring segment 4 is in the clamped down postion. At this post-clamping position, the bottom half of the clamping collar 2 is clamped down toward to the surface of the pipe or tube significantly decreasing the space between the clamping collar and the pipe or tube surface in which space the elastic ring segment 4 is confined. As a consequence, the perimeter of the annular cross cross section of the elastic ring segment 4 is forced to shrink and narrow down the opening on the cross section of said elastic ring segment as the cross section of the elastic ring segment 4 undergoes a change from a near circular annular shape of larger perimeter to a flattened elliptical or somewhat rectangular annular shape of smaller perimeter, which change results in a large compressive force within the elastic ring segment on the plane of cross section. This compressive force narrows down the opening on the cross section of the elastic ring segment and pushes two matching flanges 7 and 8 toward to one another with a tremendously large force. This force pressing two flanges to each other is of elastic nature and, consequently, maintains the leak-proof joint of two pipes or tubes for long time no matter how the seal contracts or expands. It should be noticed that the elastic coupling works in conjunction with the flanges with grooves into which the edges of the opening on the cross section of the elastic ring segments engage as shown in FIG. 1 as well as in conjunction with the flanges without groove as shown in FIG. 3. It should be further understood that the elastic coupling shown in FIGS. 1, 2 and 3 are not only elastically compressive joint but also elastically expansive joint because the opening on the cross section of the elastic ring segment can be forced open to a minute extent by further deforming the cross section geometry of the elastic ring segments when the pipe or tube joint is subjected to a large tensile force.

Figure 4:
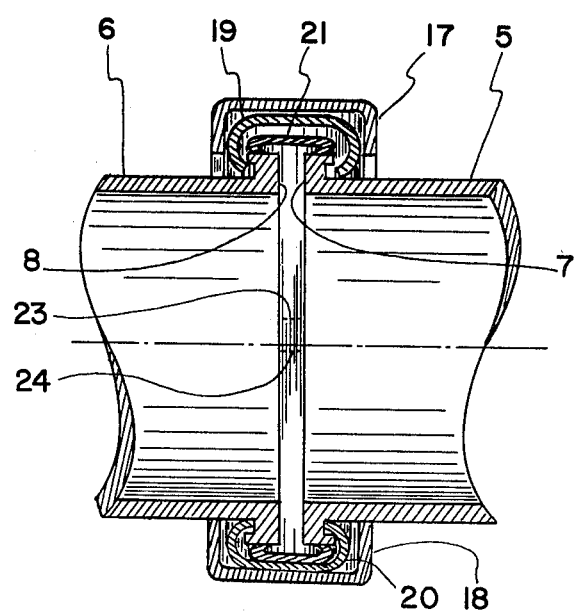
FIG. 4 illustrates another elastic coupling functioning as an elastically compressive coupling.

There is shown in FIG. 4 an elastically compressive coupling comprising the top half of the clamping collar 17 and the bottom half of the clamping collar 18 and a plurality of the elastic ring segments 19 and 20, which combination of the clamping system is clamped down around a pair of grooved flanges 7 and 8 built on each end of pipes or tubes 5 and 6. In this embodiment, a C-ring seal 21 employing the principle of the lip-seal is used in place of the O-ring seal employing the principle of the compression seal. In this illustration, the top half of the elastic coupling illustrates the elements in preclamping position while the bottom half of the elastic coupling is in postclamping position. It should be noticed in this embodiment that the elastic ring segments are not confined in the axial direction by the clamping collar and, consequently, a greater axial expansion of the joint is allowed by this type of the elastic coupling.

Figure 5:
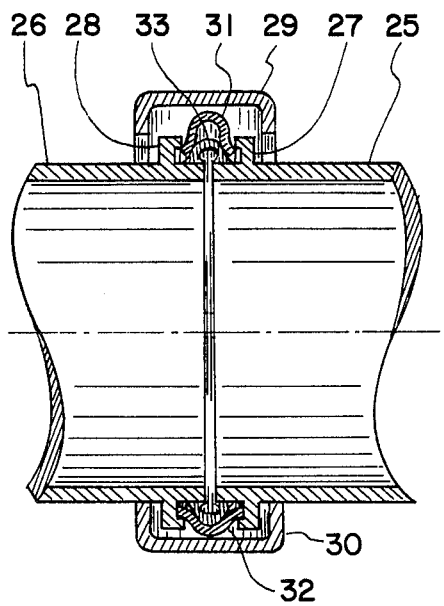
FIG. 5 illustrates a further elastic couplling functioning as an elastically expansive coupling.

In FIG. 5 there is shown another embodiment of the elastic coupling providing elastically expansive coupling, which elastic coupling comprising a pair of the clamping collar elements 29 and 30 and a plurality of the elastic ring segments 31 and 32 having a cross section of Omega shape. A C-ring seal 33 is installed in conjunction with the elastic coupling wherein the elastic ring segments 31 and 32 are confined within the space between two flanges 27 and 28 respectively disposed near each extremity of the pipes or tubes 25 and 26 and the back of the clamping collar. This type of the elastic coupling is suitable for the pipe or tube installation experiencing a compressive shock loading during the operation.

Figure 6:
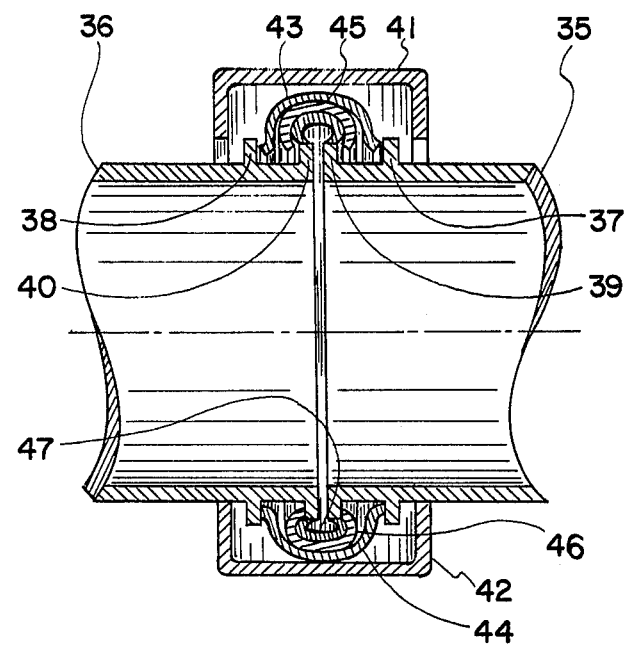
FIG. 6 illustrates a combination of the elastic couplings shown in FIGS. 4 and 5, which combination of the elastic coupling functions as an elastically expansive-compressive coupling.

In FIG. 6 there is shown the composite elastic coupling comprising the top and bottom halves of the clamping collar 41 and 42 and a plurality of the combination elastic ring segments including the elastic ring segments of Omega shaped cross section 43 and 44 superimposed on top of the elastic ring segments of the annular cross section with an opening 45 and 46, which combination of the elastic ring segments are anchored in a groove intermediate a pair of flanges 37 and 39 disposed near one extremity of a pipe or tube 35 and in another groove intermediate another pair of flanges 38 and 40 disposed near one extremity of another pipe or tube 36. The top half of the elastic coupling shows various elements in preclamping position while the bottom half illustrates the postclamping position. Of course, a C-ring seal is employed as such a seal provides an excellent sealing for expanding-contracting pipe or tube joints. This type of the composite elastic coupling is capable of absorbing tensile as well as compressive shock loading on the pipe or tube joints.

Figure 7:
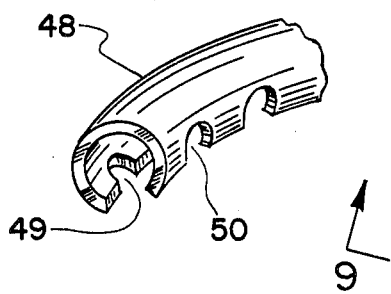
FIG. 7 illustrates an embodiment for an elastic ring segments employed in the elastic pipe or tube coupling.

In FIG. 7 there is shown an embodiment for constructing an elastic ring segments wherein a series of cutouts is provided on both edges of the opening on the cross section. The ribbed structure resulting from the cutouts 49 and 50 provides additional flexibility to the elastic ring segments. This type of the elastic ring segments is used for an elastic coupling requiring a great deal of resiliency in pipe or tube installation. Of course, the simplest and most desirable elastic ring segments are the plain ones without any cutout because of the strength and simplicity of such a structure.

Figure 8:
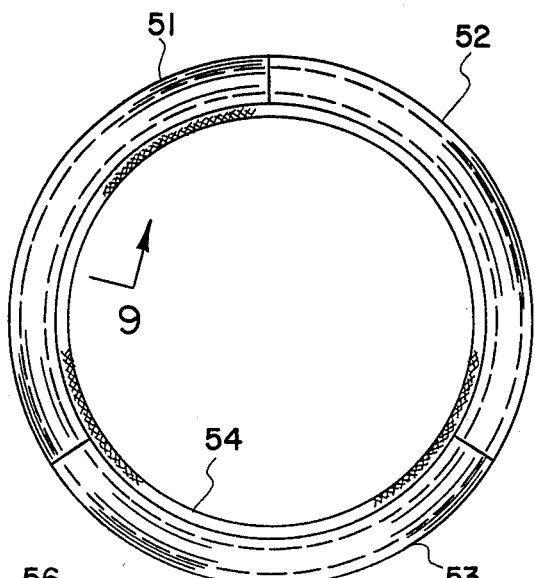
FIG. 8 illustrates a combination of a seal and a plurality of the elastic ring segments usable in conjunction with the elastic pipe or tube coupling.
Figure 9:
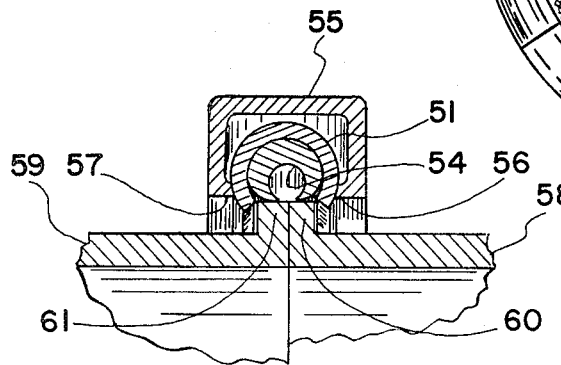
FIG. 9 illustrates a cross section of the seal-elastic ring segments combination shown in FIG. 8.

In FIG. 8 there is shown an arrangement of the elastic ring segments integrally assembled with a C-ring seal wherein a plurality of the elastic ring segments 51, 52 and 53 superimposed on top of a C-ring seal 54 provides an integral structure that can be easily slipped over and disposed around two matching flanges employed in a pipe or tube joint. The cross section of such a combination is shown in FIG. 9 wherein a clamping collar 55 ready to clamp down said combination of the elastic ring segments and the seal on to the pair of flanges 60 and 61 disposed on each end of the pipes or tubes 58 and 59 is illustrated. Here, a pair of lips 56 and 57 are provided to the clamping collar 55 as means for retaining the combination of the elastic ring segments and the seal within the groove of the clamping collar after the former is snapped into the latter. When the C-ring seal in this combination is enlarged by the stretching action, the plurality of the elastic ring segments separate from each other enabling said combination to be slipped over the coupling flanges 60 and 61.

While the principle of the invention is made clear by the illustrative embodiment, there will be many modifications of elements structure, proportions and material obvious to those skilled in the art which are particularly adapted to the specific environment and requirement without departing from the principles of the present invention.

We claim:
1. An elastic coupling for coupling two abutting ends of tubes, said elastic coupling comprising in combination:

(a) a rigid clamping collar of substantially closed loop including a groove disposed along the inward side of said rigid clamping collar, said rigid clamping collar constructed in a split structure and having means for clamping down around two tube sections having circumferential flanges at the abutting ends; and (b) a segmented hollow elastic ring of a substantially annular cross section having a slitted opening disposed along the inward side of said segmented hollow elastic ring for receiving and containing a pair of circumferential flanges of two tube sections disposed at the abutting ends, said segmented hollow elstic ring confined circumferentially within said groove included in said clamping collar wherein the clamping down action of said rigid clamping collar generates a hoop compression on said substantially annular cross section of said segmented hollow elastic ring and narrows down said slitted opening included in said hollow elastic ring for compressive coupling of a pair of circumferential flanges of two tube sections disposed at the abutting ends.

2. An elastic coupling for coupling two abutting ends of tubes, said elastic coupling comprising in combination:

(a) a rigid clamping collar of substantially closed loop including a groove disposed along the inward side of said rigid clamping collar for recieving and containing a pair of circumferential flanges of two tube sections disposed at the abutting ends, said rigid clamping collar constructed in a split structure and having means for clamping down around two tube sections having circumferential flanges disposed at the abutting ends; and (b) a segmented hollow elastic ring of Omega-shaped cross section with the slitted opening disposed along the inward side of said segmented hollow elastic ring, each of two annular edges of said segmented hollow elastic ring for engaging each of a pair of annular grooves disposed on the face of two circumferential flanges of two tubes disposed at the abutting ends, said segmented hollow elastic ring confined circumferentially within said groove included in said rigid clamping collar wherein the clamping down action of said rigid clamping collar generates the hoop compression on said Omega-shaped cross section and spreads said two annular edges of said segmented hollow elastic ring for securely retaining each of two circumferential flanges of two tube sections disposed at the abutting ends within each of two annular spaces created by said segmented hollow elastic ring confined within said groove of said rigid clamping ring.

3. An elastic coupling for coupling two abutting ends of tubes, said elastic coupling comprising in combination:

(a) a rigid clamping collar of substantially closed loop including a groove disposed along the inward side of said rigid clamping collar, said rigid clamping collar constructed in a split structure and having means for clamping down around two tube sections having circumferential grooves on the tube surfaces disposed adjacent to the abutting ends;

(b) a first segmented hollow elastic ring of a substantially annular cross section having a slitted opening disposed along the inward side of said first segmented hollow elastic ring for engaging each of two circumferential grooves on the tube surfaces disposed adjacent to the abutting ends by each of two annular edges of said first segmented hollow elastic ring; and (c) a second segmented hollow elastic ring of Omega-shaped cross section with the slitted opening disposed along the inward side of said second segmented hollow elastic ring, said second segmented hollow elastic ring superimposed on said first segmented hollow elastic ring for engaging each of two circumferential grooves on the tube surfaces disposed adjacent to the abutting ends by each of two annular edges of said second segmented hollow elastic ring, said combination of said first and said second segmented hollow elastic rings confined circumferentially within said groove of said rigid clamping collar wherein a clamping down action of said rigid clamping collar narrows down said slitted opening of said first segmented hollow elastic ring and opens up said slitted opening of said second segmented hollow elastic ring for securely coupling ends of two tubes with circumferential grooves on the tube surfaces disposed adjacent to the abutting ends.

* * * * *